United States Patent
Riggs

(10) Patent No.: US 9,856,088 B1
(45) Date of Patent: Jan. 2, 2018

(54) ADJUSTABLE IDLER SUPPORT SYSTEM FOR CONVEYOR BELT

(71) Applicant: Joy MM Delaware, Inc., Wilmington, DE (US)

(72) Inventor: Mark Daniel Riggs, Winfield, AL (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 15/207,769

(22) Filed: Jul. 12, 2016

(51) Int. Cl.
*B65G 21/10* (2006.01)
*B65G 39/12* (2006.01)
*B65G 39/00* (2006.01)
*B65G 15/08* (2006.01)
*B65G 39/16* (2006.01)

(52) U.S. Cl.
CPC ............ *B65G 21/10* (2013.01); *B65G 15/08* (2013.01); *B65G 39/16* (2013.01)

(58) Field of Classification Search
None
See application file for complete search history.

(56) References Cited

U.S. PATENT DOCUMENTS

| | | |
|---|---|---|
| 1,584,565 A | 5/1926 | Langer |
| 2,514,715 A | 7/1950 | Milik |
| 3,362,523 A | 1/1968 | Stone |
| 4,062,456 A | 12/1977 | Birdwell |
| 4,144,964 A | 3/1979 | Valcalda |
| 4,793,470 A | 12/1988 | Andersson |
| 4,898,272 A | 2/1990 | Swinderman et al. |
| 4,932,516 A | 6/1990 | Andersson |
| 5,007,528 A | 4/1991 | Hideharu |
| 5,341,920 A * | 8/1994 | Riffe ............... B65G 39/12 198/825 |
| 5,657,857 A * | 8/1997 | Neilson ............ B65G 15/00 193/35 R |
| 5,667,058 A | 9/1997 | Bonnet |
| 6,454,083 B2 | 9/2002 | Burkhart et al. |
| 6,543,607 B2 | 4/2003 | Fischer et al. |
| 6,761,264 B2 | 7/2004 | Steeber et al. |
| 6,827,198 B1 | 12/2004 | Costanzo |
| 7,762,387 B2 | 7/2010 | Dunn |

FOREIGN PATENT DOCUMENTS

CN 204038468 U 12/2014

* cited by examiner

*Primary Examiner* — Kavel Singh
(74) *Attorney, Agent, or Firm* — Michael Best & Friedrich LLP

(57) ABSTRACT

An idler support assembly is configured to support a conveyor belt thereon. The idler support assembly includes a frame having a first end and a second end, and a first idler roller coupled to the frame between the first and second ends. The first idler roller is configured to rotate about a first roller axis. The idler support assembly also includes a second idler roller coupled to the frame between the first and second ends. The second idler roller is configured to rotate about a second roller axis. The idler support assembly further includes a first base pivotably coupled to the first end of the frame about a first pivot axis, and an adjustable support selectively coupled to the second end of the frame in a plurality of positions. Each of the plurality of positions defines an angle in which the frame extends relative to the first base.

24 Claims, 7 Drawing Sheets

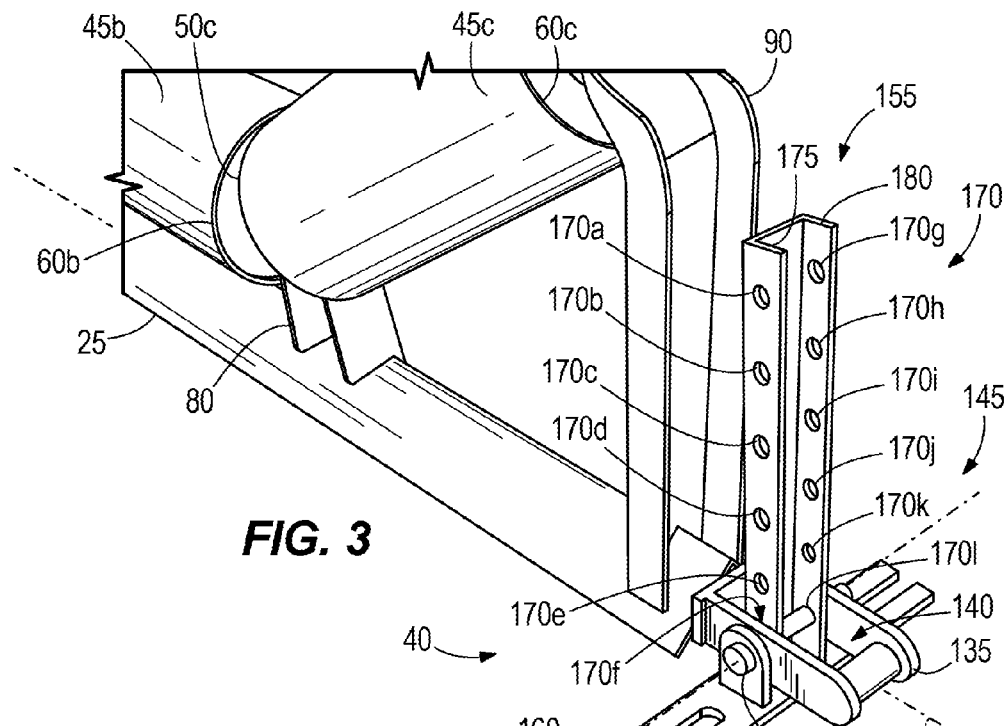
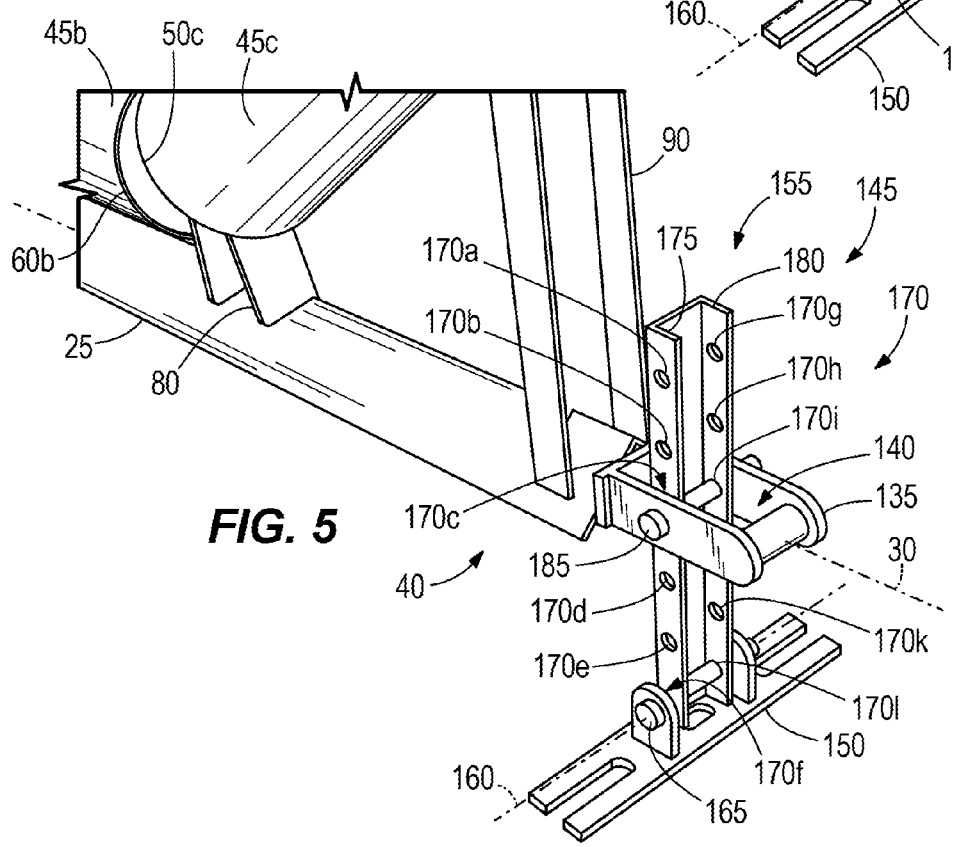

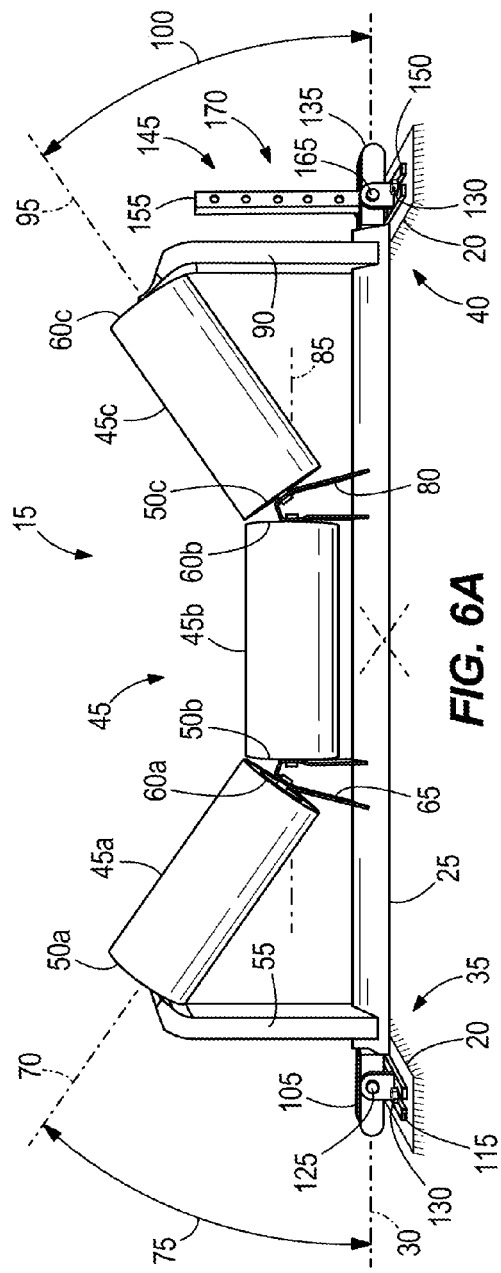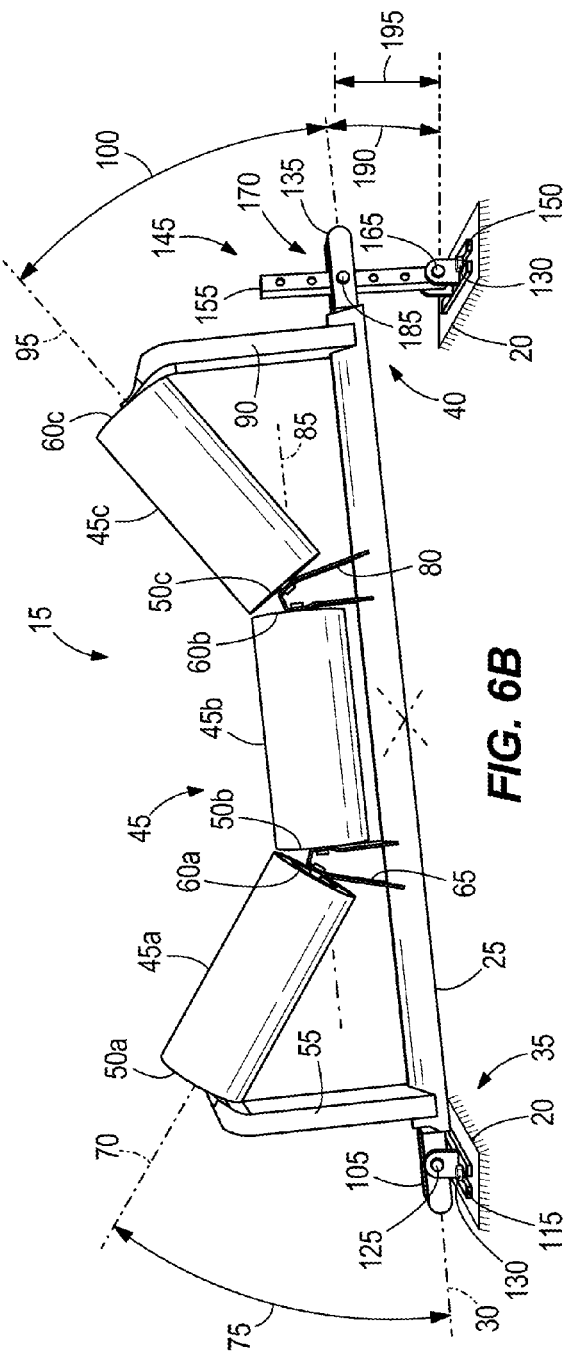

ADJUSTABLE IDLER SUPPORT SYSTEM FOR CONVEYOR BELT

BACKGROUND OF THE INVENTION

The present invention relates to idler rollers for conveyors, and in particular to an adjustable idler support assembly.

Conveyors are used frequently in the mining industry for transporting large quantities of a substance. Conveyors typically include a conveyor belt that is supported on a plurality of idler rollers and advanced by a drive system.

SUMMARY OF THE INVENTION

In one aspect, an idler support assembly is configured to support a conveyor belt thereon. The conveyor belt is operable to move material in a first direction. The idler support assembly includes a frame having a first end and a second end, and a first idler roller coupled to the frame between the first and second ends. The first idler roller is configured to rotate about a first roller axis. The idler support assembly also includes a second idler roller coupled to the frame between the first and second ends. The second idler roller is configured to rotate about a second roller axis. The first and second roller axes are oriented at an oblique angle relative to each other. The idler support assembly further includes a first base pivotably coupled to the first end of the frame about a first pivot axis. The first pivot axis is generally parallel to the first direction of the conveyor belt. The idler support assembly also includes an adjustable support selectively coupled to the second end of the frame in a plurality of positions. Each of the plurality of positions defines an angle in which the frame extends relative to the first base.

In another aspect, an idler support system is configured to support a conveyor belt thereon about a curve. The idler support system includes a first idler support assembly having a first frame with a first end and a second end and a first idler roller coupled to the first frame. The first idler roller is configured to rotate about a first roller axis. The first frame is configured to pivot about a first pivot axis at the first end of the first frame. The idler support system also includes a second idler support assembly having a second frame with a first end and a second end and a second idler roller coupled to the second frame. The second idler roller is configured to rotate about a second roller axis. The second frame is configured to pivot about a second pivot axis at the first end of the second frame. The first idler support assembly is configured to pivot about the first pivot axis independently of the second idler support assembly to guide the conveyor belt about the curve.

In yet another aspect, a method of adjusting an idler support assembly to guide a conveyor belt about a curve. The idler support assembly is configured to support the conveyor belt thereon. The method includes pivotably coupling a first end of a frame to a base about a pivot axis and supporting a first idler roller to the frame. The first idler roller is configured to rotate about a first roller axis. The method also includes supporting a second idler roller to the frame. The second idler roller is configured to rotate about a second roller axis. The first and second axes are oriented at an oblique angle relative to each other. The method further includes adjusting a height of a second end of the frame relative to the base to adjust an angle between the frame and the base to guide the conveyor belt about the curve.

In still another aspect, an idler support assembly includes a conveyor belt operable to move material in a direction. The conveyor belt defines a width. The idler support assembly includes a frame having a first end and a second end. The frame is configured to support the conveyor belt such that the width of the conveyor belt is between the first and second ends. The idler support assembly also includes a first base pivotably coupled to the first end of the frame about a pivot axis and an adjustable support selectively coupled to the second end of the frame in a plurality of positions. Each of the plurality of positions defines an angle in which the frame extends relative to the first base. The frame is configured to support the conveyor belt in each of the plurality of positions of the adjustable support.

Other aspects of the invention will become apparent by consideration of the detailed description and accompanying drawings.

BRIEF DESCRIPTION OF THE DRAWINGS

FIG. 3 is a detailed view of the adjustable idler support assembly of FIG. 2.

FIG. 5 is a detailed view of the adjustable idler support assembly of FIG. 4.

FIG. 6A is a front view of the adjustable idler support assembly of FIG. 2 in the first position.

FIG. 6B is a front view of the adjustable idler support assembly of FIG. 4 in the second position.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Figure 1:
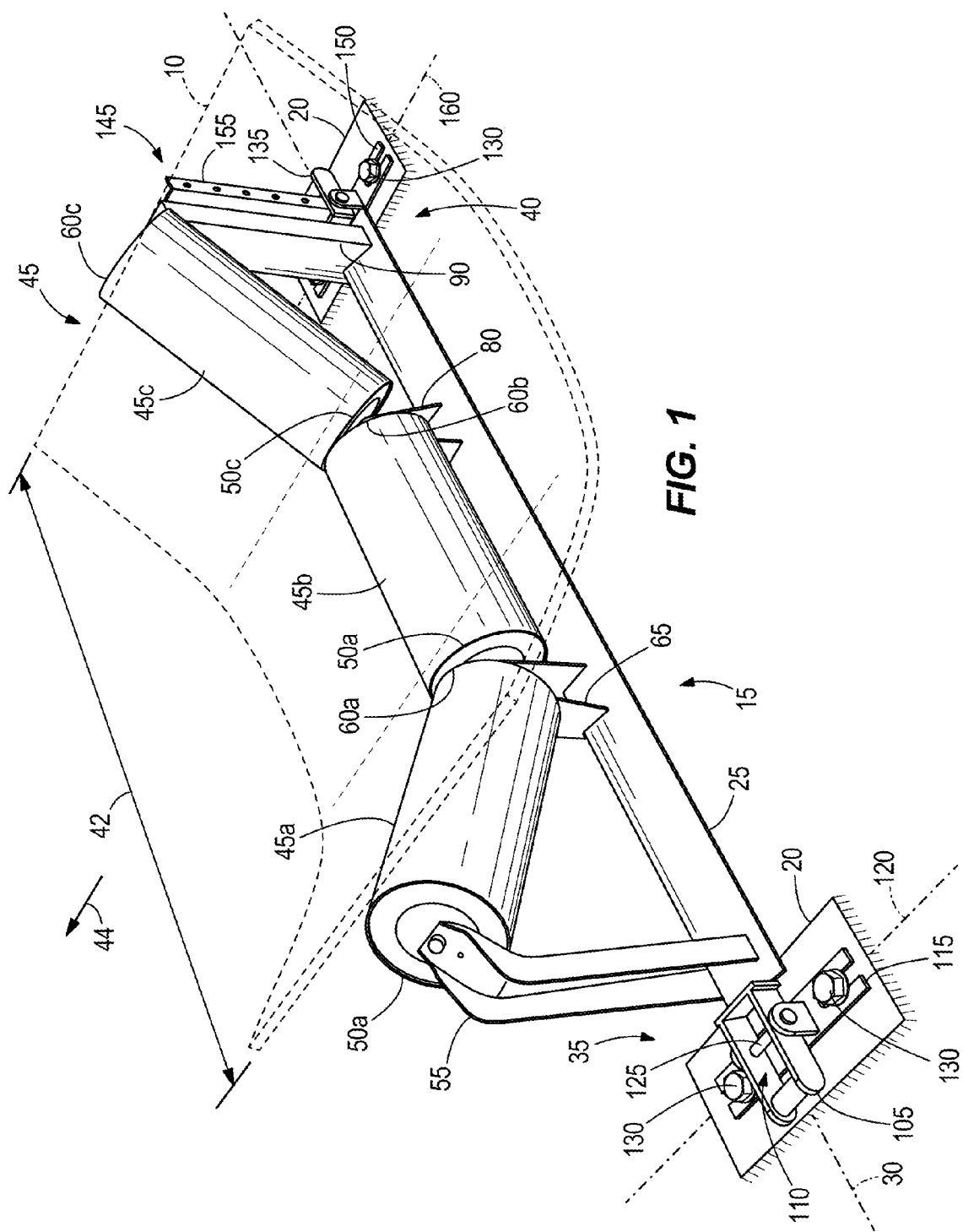
FIG. 1 is a perspective view of a conveyor belt supported on an adjustable idler support assembly of an idler support system.

FIG. 1 illustrates a conveyor 10 supported on an adjustable idler support assembly 15 above a support surface 20. The illustrated conveyor 10 is a continuous conveyor belt that is moveable relative to the adjustable idler support assembly 15 to move or transport material (e.g., coal, gravel, clay, etc.) to a desired location. In one embodiment, the conveyor 10 and the adjustable idler support assembly 15 may be used in a mining operation. The support surface 20 may consist of one continuous, planar support surface or alternatively consist of two separate, non-coplanar support surfaces.

Figure 2:
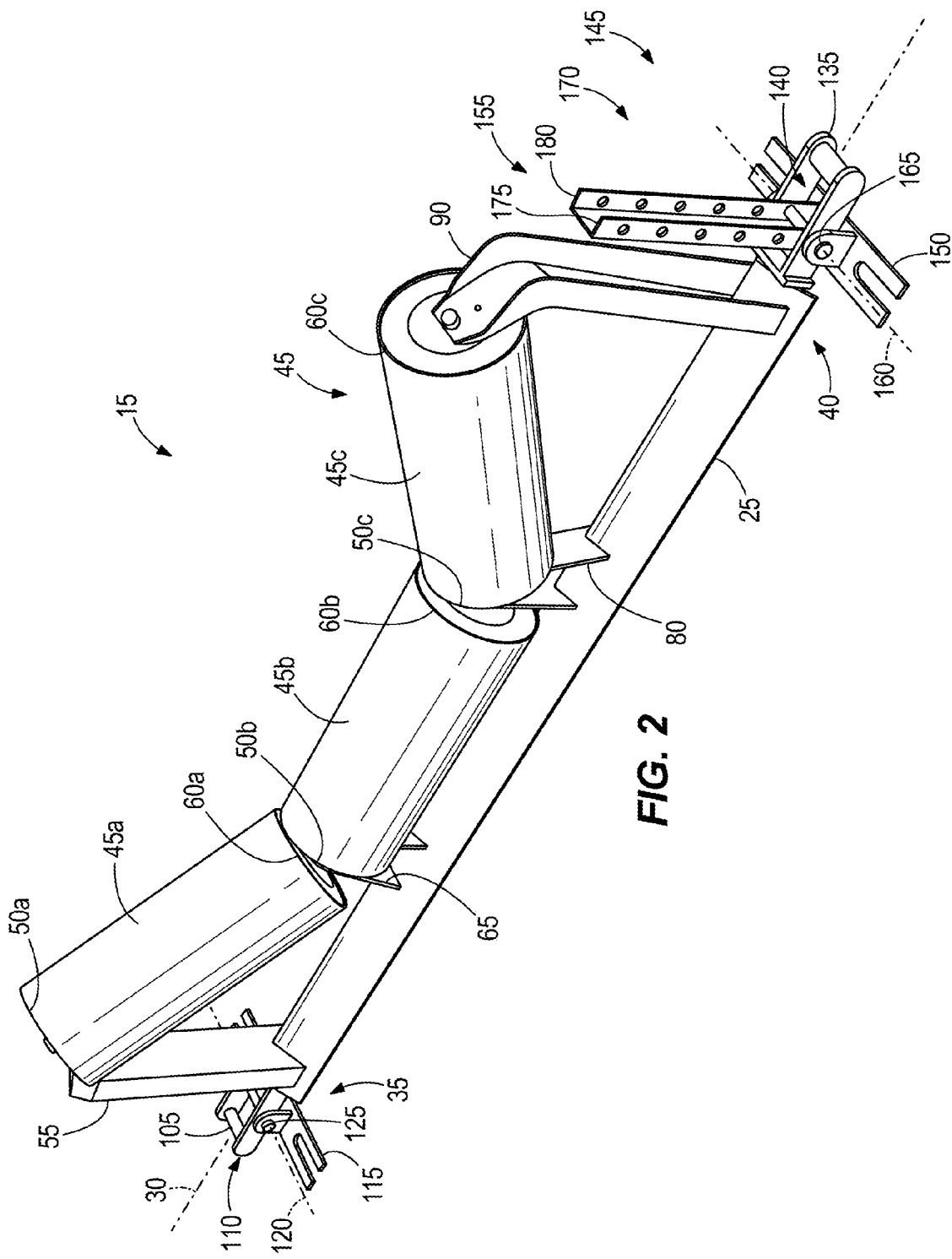
FIG. 2 is a perspective view of the adjustable idler support assembly of FIG. 1 in a first position.
Figure 4:
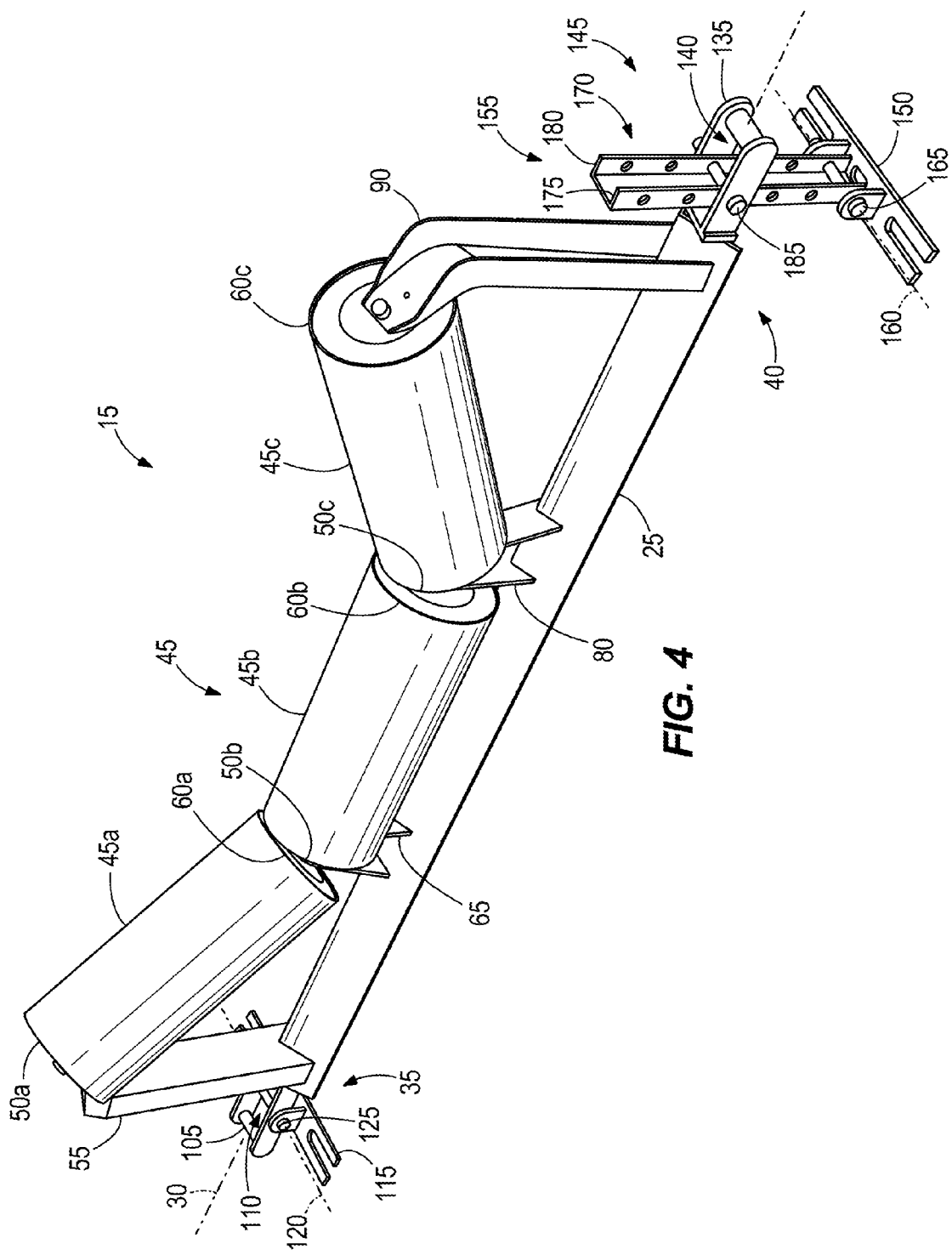
FIG. 4 is a perspective view of the adjustable idler support assembly of FIG. 1 in a second position.

With reference to FIG. 2, the illustrated adjustable idler support assembly 15 includes a frame 25 defining a longitudinal axis 30 extending between a first end 35 and a second end 40 of the frame 25. In the illustrated embodiment, a width 42 of the conveyor belt 10 is located between the first and second ends 35, 40, and the conveyor belt 10 is configured to move in a direction 44 generally perpendicular to the longitudinal axis 30. A plurality of idler rollers 45 are supported on the frame 25 between the first and second ends 35, 40. In particular, a first idler roller 45a includes a first end 50a coupled to a first support member 55 and a second end 60a coupled to a second support member 65. The first and second support members 55, 65 extend generally perpendicular to the longitudinal axis 30 and are fixed to the frame 25. The illustrated first idler roller 45a is rotatable relative to the frame 25 about a first roller axis 70 that is oriented relative to the longitudinal axis 30 at a first oblique angle 75 (FIG. 6A). In one embodiment (not shown), the first oblique angle 75 may be adjustable by adjusting the height of the first support member 55.

With continued reference to FIG. 2, a second idler roller 45b includes a first end 50b coupled to the second support member 65 and a second end 60b coupled to a third support member 80. The third support member 80 extends generally perpendicular to the longitudinal axis 30 and is fixed to the frame 25. The illustrated second idler roller 45b is rotatable relative to the frame 25 about a second roller axis 85 that is oriented parallel relative to the longitudinal axis 30 (FIG. 6A).

A third idler roller 45c includes a first end 50c coupled to the third support member 80 and a second end 60c coupled to a fourth support member 90. The fourth support member 90 extends generally perpendicular to the longitudinal axis 30 and is fixed to the frame 25. The illustrated third idler roller 45c is rotatable relative to the frame 25 about a third roller axis 95 that is oriented relative to the longitudinal axis 30 at a second oblique angle 100 (FIG. 6A). In one embodiment, the second oblique angle 100 may be adjustable by adjusting the height of the fourth support member 90. In the illustrated embodiment, the second oblique angle 100 is equal and opposite relative to the first oblique angle 75. In another embodiment, the second oblique angle 100 may be a different angle relative to the first oblique angle 75. In the illustrated embodiment, the roller axes 70, 85, 95 are generally planar with the longitudinal axis 30 (i.e., the roller axes 70, 85, and 95 lie in a common plane with the longitudinal axis 30).

With reference back to FIG. 1, the first end 35 of the frame 25 includes a first handle 105 having a first opening 110 configured to enable transportation of the idler support assembly 15. The first handle 105 is pivotally attached to a first base 115 about a first pivot axis 120 via a first pin 125. The illustrated first pivot axis 120 is generally perpendicular to the longitudinal axis 30 and the width 42 (e.g., the first pivot axis 120 is generally parallel to the direction 44 of movement of the conveyor belt 10). The illustrated first base 115 is configured to be fixed to the support surface 20 via fasteners 130. In other embodiments, the first handle 105 may be omitted such that the first end 35 of the frame 25 is generally defined by the first pivot axis 120.

With reference to FIGS. 2 and 3, the second end 40 of the frame 25 includes a second handle 135 having a second opening 140 configured to also enable transportation of the idler support assembly 15. The second handle 135 is selectively coupled to an adjustable support 145 that includes a second base 150 pivotably coupled to a support member 155 about a second pivot axis 160 via a second pin 165. In one embodiment (not shown), each of the first and second ends 35, 40 of the frame 25 is coupled to a separate adjustable support 145. The illustrated second base 150 is similar to the first base 115, which is configured to be fixed to the support surface 20 via fasteners 130 (FIG. 1). In other embodiments, the first and second bases 115, 150 may be one integral base. In further embodiments, the second handle 135 may be omitted such that the second end 40 of the frame 25 is generally defined by the aperture that receives the second pin 165.

The illustrated support member 155 is moveably positioned within the second opening 140 of the second handle 135 and includes a plurality of apertures 170. In the illustrated embodiment, the support member 155 is a member having a C-shaped cross-section defining a first flange 175 and a second flange 180. The support member 155 includes the plurality of apertures 170 equally spaced on the flanges 175, 180 and corresponding with an aperture located on the opposing flange 175, 180. For example, with reference to FIGS. 3 and 5, apertures 170a-170f are located on the first flange 175 that align with a corresponding aperture 170g-170l located on the second flange 180. The second handle 135 is coupled to the support member 155 by a third pin 185 that is selectively received through the apertures 170a-170e, 170g-170k (FIG. 5). The second handle 135 is also coupled to the support member 155 by the second pin 165 that is selectively received through the apertures 170f, 170l (FIG. 3). In another embodiment, apertures 170a-170f may be replaced with a first slot extending from the first aperture 170a to the sixth aperture 170f, and apertures 170g-170l may be replaced with a second slot extending from the seventh aperture 170g to the twelfth aperture 170l. In this embodiment, a fastener (e.g., a wing screw) may selectively secure the second handle 135 at a plurality of positions relative to the support member 155. Stated another way, the second handle 135 is continuously adjustable relative to the support member 155 by the fastener engaging at least one of the first and second slots.

In one embodiment (not shown), the third pin 185 may be replaced with a biased detent mechanism that is selectively received through the apertures 170a-170e, 170g-170k. In another embodiment (not shown), the support member 155 may be fixed to the second base 150 with the support member 155 defining an elongated curved member (e.g., curving from the second base 150 towards the first base 115). In another embodiment (not shown), the adjustable support 145 may include telescoping members that couple the second end 40 of the frame 25 to the second base 150. In another embodiment (not shown), the second base 150 may be omitted such that the support member 155 directly engages the support surface 20.

Figure 6C:
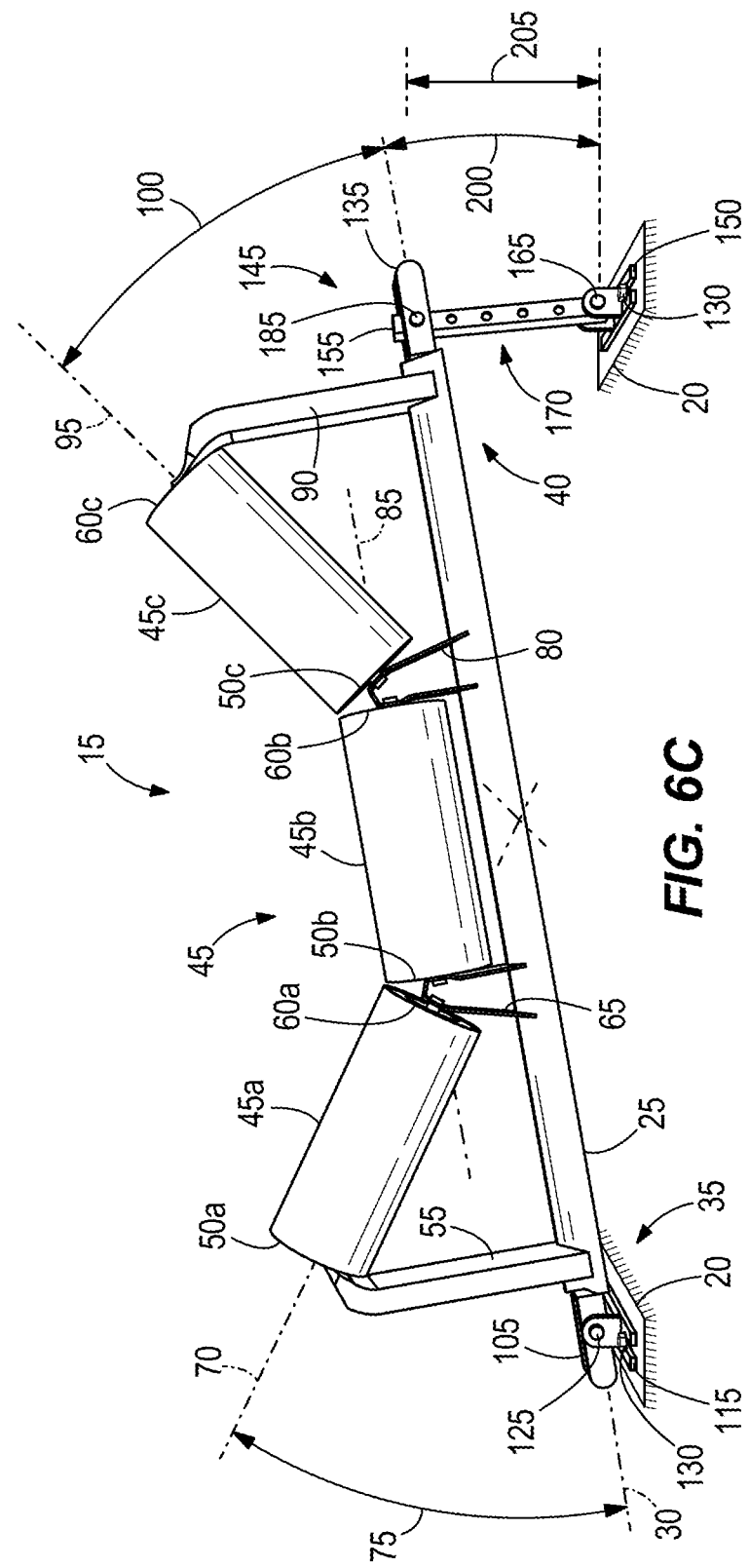
FIG. 6C is a front view of the adjustable idler support assembly of FIG. 1 in a third position.

With reference to FIGS. 6A-C, the adjustable idler support assembly 15 is arranged in different positions relative to the support surface 20. FIG. 6A illustrates a first position of the adjustable idler support assembly 15 with the second pin 165 coupling the second handle 135 to the adjustable support 145 through the sixth and twelfth apertures 170f, 170l. In the first position of the adjustable idler support assembly 15, the longitudinal axis 30 of the frame 25 is parallel with the support surface 20 (e.g., the longitudinal axis 30 is oriented zero degrees relative to the first and second bases 115, 150 about the first pivot axis 120).

FIG. 6B illustrates a second position of the adjustable idler support assembly 15 with the third pin 185 coupling the second handle 135 to the adjustable support 145 through the third and ninth apertures 170c, 170i. In the second position of the adjustable idler support assembly 15, the longitudinal axis 30 of the frame 25 is oriented at a first pivot angle 190 relative to the first and second bases 115, 150 about the first pivot axis 120 such that the second end 40 of the frame 25 is positioned at a first height 195 above the first and second bases 115, 150. When the adjustable idler support assembly 15 moves from the first position (FIG. 6A) to the second position (FIG. 6B), the roller axes 70, 85, 95 remain fixed relative to the longitudinal axis 30.

FIG. 6C illustrates a third position of the adjustable idler support assembly 15 with the third pin 185 coupling the second handle 135 to the adjustable support 145 through the first and seventh apertures 170a, 170g. In the third position of the adjustable idler support assembly 15, the longitudinal axis 30 of the frame 25 is oriented at a second pivot angle 200 relative to the first and second bases 115, 150 about the first pivot axis 120 such that the second end 40 of the frame 25 is positioned at a second height 205 above the first and second bases 115, 150. When the adjustable idler support assembly 15 moves from the second position (FIG. 6B) to the third position (FIG. 6C), the roller axes 70, 85, 95 remain fixed relative to the longitudinal axis 30.

In the illustrated embodiment, the adjustable idler support assembly 15 is selectively arranged in six different positions corresponding to six pairs of apertures 170 (e.g., six different angles of the longitudinal axis 30 of the frame 25 relative to the first and second bases 115, 150 that correspond to six different heights of the second end 40 of the frame 25 relative to the first and second bases 115, 150). In other embodiments, the support member 155 may include more or less than six pairs of apertures 170 enabling the adjustable idler support assembly 15 to be selectively arranged in more or less than six different positions.

Figure 7:
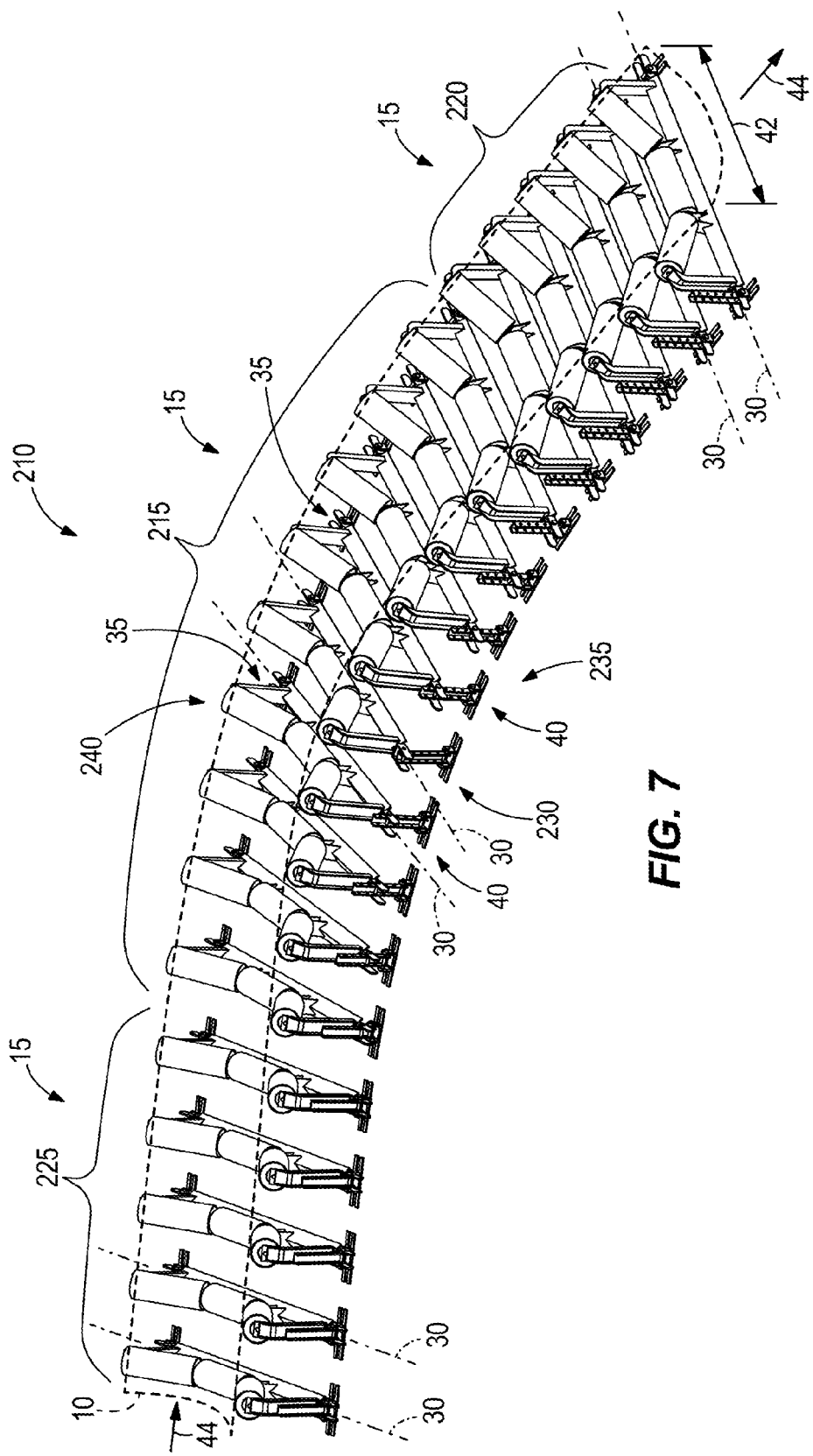
FIG. 7 is a perspective view of the conveyor belt of FIG. 1 supported on the idler support system including a plurality of the adjustable idler support assemblies.

With reference to FIG. 7, an idler support system 210 includes a plurality of adjustable idler support assemblies 15 arranged relative to each other such that the conveyor belt 10 is guided around a curved portion 215 that is positioned between two straight portions 220, 225. In particular, within each straight portion 220, 225, each of the adjustable idler support assemblies 15 are oriented in the first position, as illustrated in FIGS. 1-3 and 6A. In addition, each longitudinal axis 30 of the adjustable idler support assemblies 15 within the straight portions 220, 225, are oriented parallel to each other. Accordingly, the conveyor belt 10 is linearly guided through the straight portions 220, 225 by the adjustable idler support assemblies 15.

In order to curve the conveyor belt 10 through the curved portion 215, the adjustable idler support assemblies 15 are oriented at one of the six different positions. For example, the adjustable idler support assembly 15 oriented in the third position, as illustrated in FIG. 6C, is positioned near the midpoint (e.g., apex) 230 of the curved portion 215. In alternative embodiments, more than one adjustable idler support assembly 15 oriented in the third position is positioned near the midpoint 230 of the curved portion 215. The adjustable idler support assemblies 15 then incrementally move from the third position (FIG. 6C) to the first portion (FIG. 6A) as each adjustable idler support assembly 15 moves closer to the straight portions 220, 225 from the apex 230. The belt 10 exhibits a resilient tendency to extend linearly (i.e., remain straight) due to the material properties of the belt 10. The banking of the adjustable idler support assemblies 15 within the curved portion 215 curve or bend the belt 10 by providing a force acting against the resilient tendency of the belt 10 to remain straight. In other words, the adjustable idler support assemblies 15 are banked (e.g., elevated) to maintain the curvature of the belt 10. The second ends 40 of the adjustable idler support assemblies 15 supporting the curved portion 215 of the belt 10 are positioned on the inside of the curve (i.e., the second ends 40 are positioned closer than the first ends 35 to a center-point from which the curve radius extends). In other words, the second ends 40 are positioned on an inside or concave side 235 of the curved portion 215 and the first ends 35 are positioned on an outside or convex side 240 of the curved portion 215.

With continued reference to FIG. 7, each longitudinal axis 30 of the adjustable idler support assemblies 15 located within the curved portion 215 is oriented at an angle relative to each other (e.g., in a direction parallel to the movement direction 44 of the conveyor belt 10). Accordingly, the conveyor belt 10 is generally guided through the curved portion 215 at angles defined by each angle of the adjustable idler support assemblies 15. Stated another way, the adjustable idler support assemblies 15 generally support the conveyor belt 10 at each angle of the adjustable idler support assemblies 15 as the conveyor belt 10 moves through the portions 215, 220, 225. In other embodiments, the plurality of adjustable idler support assemblies 15 may be oriented in any combination of the different positions to adapt the curved portion 215 to a specific need (e.g., guiding the conveyor belt 10 around one or more curved portions 215).

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. An idler support assembly configured to support a conveyor belt thereon, the conveyor belt operable to move material in a first direction, the idler support assembly comprising:
   a frame including a first end and a second end;
   a first idler roller coupled to the frame between the first and second ends, the first idler roller configured to rotate about a first roller axis;
   a second idler roller coupled to the frame between the first and second ends, the second idler roller configured to rotate about a second roller axis, wherein the first and second roller axes are oriented at an oblique angle relative to each other;
   a first fixed base defining a first pivot axis, the first end of the frame pivotably coupled to the first fixed base about the first pivot axis, the first pivot axis is generally parallel to the first direction of the conveyor belt; and
   an adjustable support selectively coupled to the second end of the frame in a plurality of positions, wherein each of the plurality of positions defines an angle in which the frame extends relative to the first fixed base.

2. The idler support assembly of claim 1, wherein each of the plurality of positions defines a plurality of heights of the second end of the frame relative to the first fixed base.

3. The idler support assembly of claim 1, wherein the adjustable support includes a support member coupled to a second base.

4. The idler support assembly of claim 3, wherein the support member is pivotably coupled to the second base.

5. The idler support assembly of claim 3, wherein the support member includes a plurality of apertures, and wherein each of the plurality of apertures corresponds to one of the plurality of positions.

6. The idler support assembly of claim 5, wherein the frame is coupled to the support member in one of the plurality of positions by a second pin received through one of the plurality of apertures and engaging the second end of the frame.

7. The idler support assembly of claim 1, wherein the first end of the frame includes a first handle configured to enable transportation of the idler support assembly by an operator.

8. The idler support assembly of claim 7, wherein the second end of the frame includes a second handle configured to enable transportation of the idler support assembly by the operator.

9. The idler support assembly of claim 1, wherein the orientation of the first and second roller axes relative to the frame remains fixed as the adjustable support is selectively coupled to the second end of the frame in the plurality of positions.

10. An idler support system configured to support a conveyor belt thereon about a curve, the idler support system comprising:
a first idler support assembly including
a first frame including a first end and a second end;
a first idler roller coupled to the first frame, the first idler roller configured to rotate about a first roller axis, wherein the first end of the first frame is configured to pivot about a first pivot axis defined by a first fixed base; and
a second idler support assembly including
a second frame including a first end and a second end;
a second idler roller coupled to the second frame, the second idler roller configured to rotate about a second roller axis, wherein the first end of the second frame is configured to pivot about a second pivot axis defined by a second fixed base;
wherein the first idler support assembly is configured to pivot about the first pivot axis independently of the second idler support assembly to guide the conveyor belt about the curve.

11. The idler support system of claim 10, wherein the first idler support assembly is pivotable at a first angle defined by the first frame relative to the first fixed base about the first pivot axis, and the second idler support assembly is pivotable at a second angle defined by the second frame relative to the second fixed base about the second pivot axis, and wherein the first angle is greater than the second angle to guide the conveyor belt about the curve.

12. The idler support system of claim 11, wherein the second end of the first frame is selectively coupled to a first adjustable support, and the second end of the second frame is selectively coupled to a second adjustable support, and wherein adjustment of the first or second adjustable supports changes the corresponding first or second angle.

13. The idler support system of claim 12, wherein each of the first and second adjustable supports includes a support member coupled to a third base, and wherein each support member includes a plurality of apertures, and wherein the first and second angles correspond to one of the plurality of apertures of each support member.

14. The idler support system of claim 13, wherein each support member of the first and second adjustable supports is pivotably coupled to the corresponding third base.

15. The idler support system of claim 13, wherein the first frame is coupled to the support member of the first adjustable support by a first pin received through one of the plurality of apertures and engaging the second end of the first frame, and wherein the second frame is coupled to the support member of the second adjustable support by a second pin received through one of the plurality of apertures and engaging the second end of the second frame.

16. The idler support assembly of claim 10, wherein the first ends of the first and second frames each include a first handle configured to enable transportation of the first and second idler support assemblies by an operator.

17. The idler support assembly of claim 16, wherein the second ends of the first and second frames each include a second handle configured to enable transportation of the first and second idler support assemblies by the operator.

18. The idler support assembly of claim 10, wherein the second ends of the first and second idler support assemblies are positioned on an inside of the curve.

19. A method of adjusting an idler support assembly to guide a conveyor belt about a curve, the idler support assembly configured to support the conveyor belt thereon, the method comprising:
pivotably coupling a first end of a frame to a fixed base about a pivot axis, the fixed base defining the pivot axis;
supporting a first idler roller to the frame, the first idler roller configured to rotate about a first roller axis;
supporting a second idler roller to the frame, the second idler roller configured to rotate about a second roller axis, wherein the first and second axes are oriented at an oblique angle relative to each other;
adjusting a height of a second end of the frame relative to the fixed base to adjust an angle between the frame and the fixed base to guide the conveyor belt about the curve.

20. The method of claim 19, wherein adjusting the height of the second end of the frame includes selectively coupling the second end of the frame to one of a plurality of apertures of an adjustable support by a pin.

21. The method of claim 20, further comprising positioning the second end of the frame on an inside of the curve.

22. An idler support assembly including a conveyor belt operable to move material in a direction, the conveyor belt defining a width, the idler support assembly comprising:
a frame including a first end and a second end, the frame configured to support the conveyor belt such that the width of the conveyor belt is between the first and second ends;
a first fixed base defining a pivot axis, the first end of the frame pivotably coupled to the first fixed base about the pivot axis; and
an adjustable support selectively coupled to the second end of the frame in a plurality of positions, wherein each of the plurality of positions defines an angle in which the frame extends relative to the first fixed base;
wherein the frame is configured to support the conveyor belt in each of the plurality of positions of the adjustable support.

23. The idler support assembly of claim 22, wherein the pivot axis is generally parallel to the direction of movement of the conveyor belt.

24. The idler support assembly of claim 22, further comprising an idler roller coupled to the frame between the first and second ends, wherein the idler roller is configured to rotate about a roller axis to support the conveyor belt.

* * * * *